No Printed Specification Available
7021X
T. W. Harvey,
Cotton Press.
Patented Apr. 27, 1832.
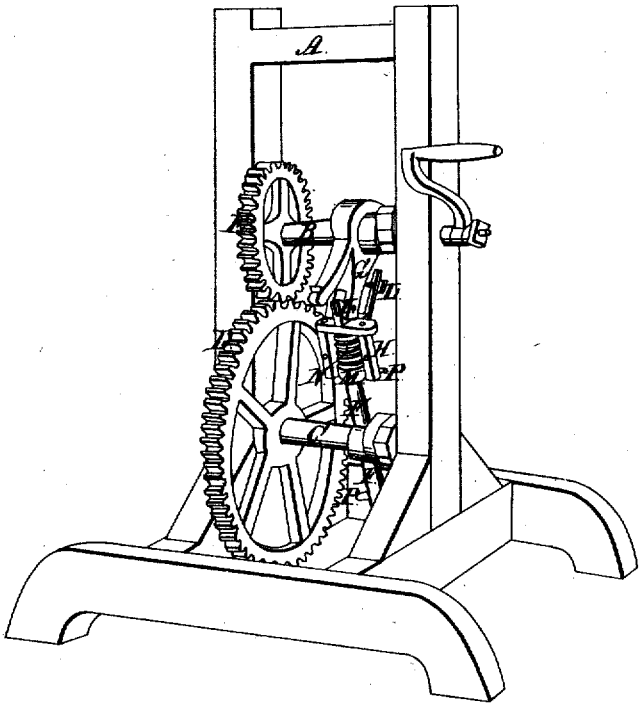

7021X

Apr 27, 1832

Thomas W. Harvey Jamestown New York.

Letters Patent (= 7,021 X)

The Schedule referred to in these Letters Patent and making part of the same containing a description in the words of the said Thomas W. Harvey himself of his improvement being a Rotary Toggle Joint Press.

Be it known that I Thomas W. Harvey of Jamestown Chatauque County State of New York have made an improvement being a Rotary Toggle Joint Press which is described as follows 1st The frame marked A in the annexed drawing is constructed of any convenient size and shape adapted to the machinery intended to be used there in. 2nd The shafts B C are constructed of sufficient size and strength and placed parallel to each other turning on journals in boxes beneath the frame. These shafts are denominated the clamp shaft and joint shaft; upon the clamp shaft C is a cog wheel D of any required diameter and number of cogs. Upon the joint shaft is also a cog wheel E which works into the aforesaid cog wheel and is of half its diameter. Upon the clamp shaft are placed a number of clamps [illegible] properly constructed for the purpose intended in number twice that of the number of [illegible] [illegible] to be [illegible] into which dies are placed for the impressions to be made. Upon the joint shaft are placed a number of toggle joints only the number half that the number of clamps. The peripheries of the circles in which they move are of equal diameter. The length of the arm [illegible] of the toggle joint from the fulcrum outward is equal to the length of either from the periphery to the end of the shaft. The arm from the fulcrum to the joint outward is pitched forward by the application of a spring either above or below the joint the pitch being governed by a regulating screw. [illegible] [illegible] from [illegible] as follows upon the [illegible] and [illegible] [illegible] by the action of a spiral spring [illegible] upon one [illegible] the arm and [illegible] by a [illegible] [illegible] [illegible] the [illegible] from [illegible] beyond a given point In this [illegible] [illegible] [illegible] be placed [illegible] dies and by [illegible] different impressions in the [illegible] [illegible] all kinds of [illegible] [illegible] may be made. The said [illegible] [illegible] [illegible] [illegible] [illegible] [illegible]

374 7021X the opposite side upon the Clamp Shaft C. hereafter more particularly described in
the operation of the Press.

Operation

The motion to be [illegible] through a crank or applied either by hand or by any con-
venient machinery to the disc attached to either shaft. the motion being thus
in motion by the [illegible] the arms of the toggle [illegible] are
brought in contact with the clamps [illegible] upon [illegible] arrive at the parallel line of the
centres of the shafts, the sliding piece [illegible] being thrown [illegible] by the spiral spring
[illegible] and the arms being pitched forward in a line with the clamps to the centre
of the clamp shaft by the operation of the spring [illegible] and regulating [illegible] to end at
a point where the parts meet. The end of the arm [illegible] allowing [illegible] the clamp
[illegible] the motion of the outer end of the arm by the [illegible] movement
of the clamp shaft while the accelerating motion [illegible] of the joint shaft being
up [illegible] the toggle joint at the [illegible] of power on the parallel line
of the centres of the shafts [illegible] that a central impression is given to the arm upon
the centre of the clamp shaft during the contact of the parts.

The sizes of the wheels and their proportions, the [illegible]
[illegible] of the clamps, the length of arm, the proportion of the [illegible] shaft to the other
the number of toggle [illegible] to the number of clamps, may all be varied by dif-
ferent arrangements and proportions retaining however the same principles of
action of the press. The pressure can be given not only directly upon the place
at the junction of the two parts as before described but by an application of the
press upon a bar upon which the die may be placed and is also adapted
to give motion to a bar without the [illegible] press.

The power may be applied to either shaft and the press
worked with the shafts in a perpendicular horizontal or other position. This
press can be employed for making [illegible] nails, [illegible] buttons, [illegible]
[illegible] or in any [illegible] striking all kinds of dies or any other impressions
upon all kinds of metal or other materials.

What I claim as my invention is the application of the
principle of the [illegible] described, Rotary Toggle Joint Press, whether the same be
made in the form represented in the accompanying drawing or in any other way
upon the same principle it being capable of an infinite variety of combinations
and applications while the same principle of action [illegible]

7021X

370

[illegible] by virtue of a certain [illegible] which is usually called the Eagle Point
in Alex. Francis. The [illegible] of [illegible] described in [illegible]
Eleventh day of April in the Thousand Eight Hundred and
and Sixty Two Witness
Jno. Pleasant
Wm. P. Elliot Thomas H. Harvey

1862